United States Patent
Asada

(10) Patent No.: US 10,965,372 B2
(45) Date of Patent: Mar. 30, 2021

(54) OPTICAL TRANSMISSION DEVICE AND SPECTRUM CONTROL METHOD

(71) Applicant: NEC Corporation, Tokyo (JP)

(72) Inventor: Hideo Asada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/635,047

(22) PCT Filed: Aug. 22, 2018

(86) PCT No.: PCT/JP2018/030923
§ 371 (c)(1),
(2) Date: Jan. 29, 2020

(87) PCT Pub. No.: WO2019/044604
PCT Pub. Date: Mar. 7, 2019

(65) Prior Publication Data
US 2020/0244356 A1    Jul. 30, 2020

(30) Foreign Application Priority Data
Aug. 29, 2017  (JP) .............................. JP2017-164182

(51) Int. Cl.
*H04B 10/00*    (2013.01)
*H04B 10/079*    (2013.01)
(Continued)

(52) U.S. Cl.
CPC ......... *H04B 10/0797* (2013.01); *H04B 10/25* (2013.01); *H04B 10/572* (2013.01); *H04J 14/02* (2013.01)

(58) Field of Classification Search
CPC .. H04B 10/0797; H04B 10/25; H04B 10/572; H04B 10/50; H04B 10/675;
(Continued)

(56) References Cited

U.S. PATENT DOCUMENTS 6,219,162 B1 *  4/2001  Barnard .............. H04J 14/0221
                                                                398/9
8,818,189 B2 *  8/2014  Izumi ................. H04B 10/0795
                                                                398/29
(Continued)

FOREIGN PATENT DOCUMENTS

EP      2 985 930 B1     3/2018
JP      2014-192615      10/2014
(Continued)

OTHER PUBLICATIONS

International Search Report dated Nov. 6, 2018, in the corresponding PCT International Application.
(Continued)

*Primary Examiner* — Hibret A Woldekidan
(74) *Attorney, Agent, or Firm* — Finnegan, Henderson, Farabow, Garrett & Dunner, L.L.P.

(57) ABSTRACT

The function of each component of an optical transmission device is as follows. The wavelength selecting means has a means for selecting an optical signal, and a means for outputting a signal after adjusting the signal level. The optical amplifying means amplifies the wavelength multiplexed signal having the adjusted signal level. The measuring means measures the spectrum of the amplified wavelength multiplexed signal. The setting means sets a spectrum shape, which serves as a reference of the wavelength multiplexed signal to be outputted to the transmission line, as output spectrum setting information. The control means compares the measured spectrum with the output spectrum setting information and determines the attenuation amount when adjusting the signal level for each wavelength of the wavelength multiplexed signal in the wavelength selecting means. The wavelength selecting means adjusts the signal level on the basis of the determined attenuation amount.

8 Claims, 7 Drawing Sheets

(51) Int. Cl.
*H04B 10/25* (2013.01)
*H04B 10/572* (2013.01)
*H04J 14/02* (2006.01)

(58) Field of Classification Search
CPC ........ H04B 10/07955; H04B 10/07953; H04B 10/07957; H04B 10/564; H04B 10/671; H04B 10/2507; H04J 14/02; H04J 14/0201; H04J 14/0265; H04J 14/0212; H04J 14/0221; H04Q 2011/0081; H04Q 2011/0049; H04Q 11/0005; H04Q 2011/0015; H04Q 2011/0016; G02B 6/29385
USPC .... 398/25, 26, 27, 28, 34, 37, 38, 158, 159, 398/160, 192, 194, 195, 196, 197, 48
See application file for complete search history.

(56) References Cited

U.S. PATENT DOCUMENTS

| | | | |
|---|---|---|---|
| 8,818,190 B2 * | 8/2014 | Hayashi | H04B 10/07955 398/34 |
| 10,298,317 B2 * | 5/2019 | Mertz | G02B 6/29322 |
| 10,547,408 B2 * | 1/2020 | He | H04B 10/5053 |
| 2004/0081421 A1 * | 4/2004 | Mori | H04J 14/0221 385/140 |
| 2008/0267631 A1 | 10/2008 | Collings et al. | |
| 2012/0063775 A1 * | 3/2012 | Bruno | H04B 10/0777 398/34 |
| 2017/0117983 A1 * | 4/2017 | Al Sayeed | H04J 14/0221 |

FOREIGN PATENT DOCUMENTS

| | | |
|---|---|---|
| JP | 2016-208519 | 12/2016 |
| JP | 6067192 | 1/2017 |
| WO | WO 2010/105687 A1 | 9/2010 |

OTHER PUBLICATIONS

Form PCT/ISA/237(English version).
Extended European Search Report dated Oct. 27, 2020, issued by the European Patent Office in counterpart European Patent Application No. 18850844.4.

* cited by examiner

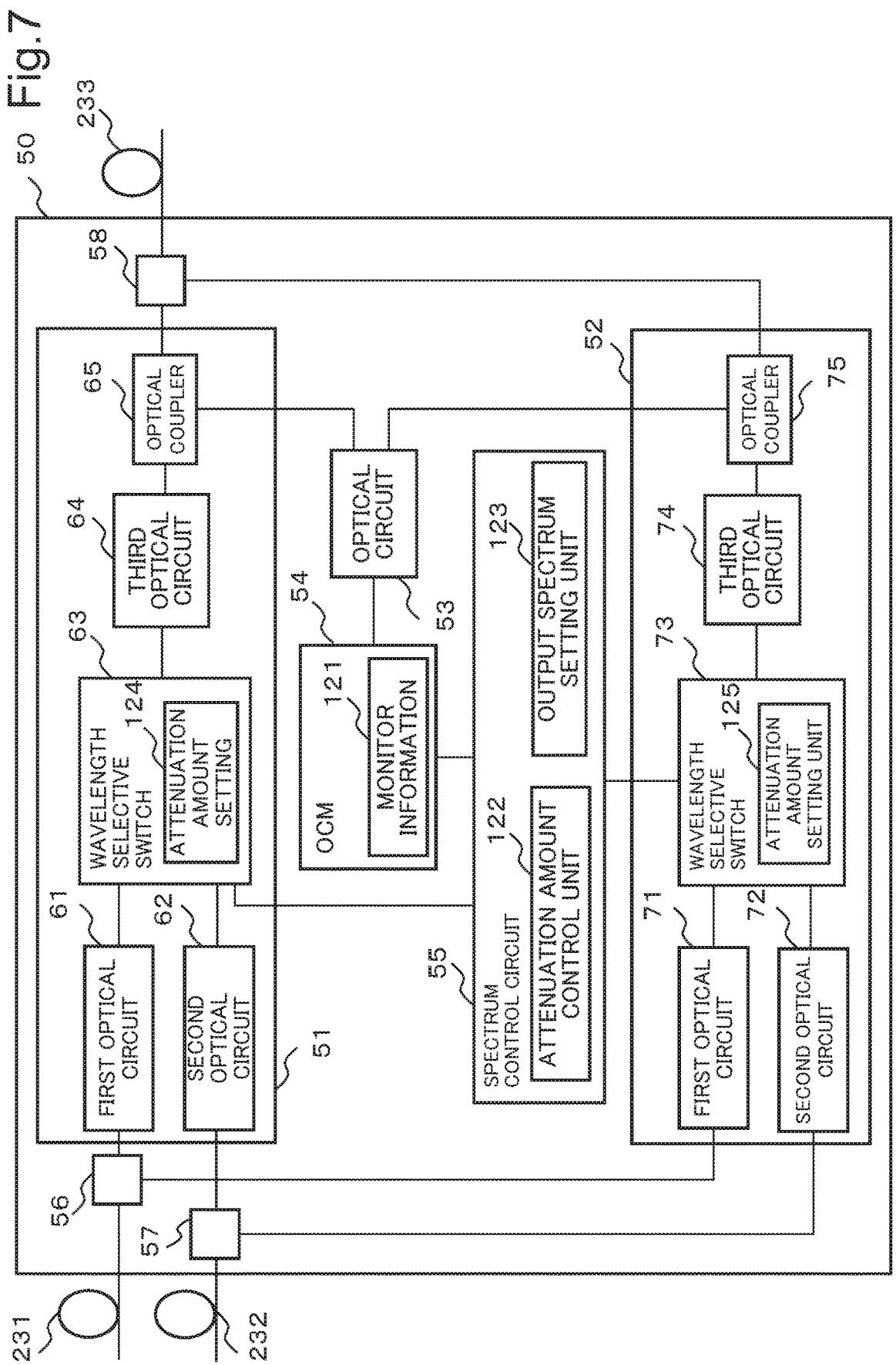

OPTICAL TRANSMISSION DEVICE AND SPECTRUM CONTROL METHOD

CROSS-REFERENCE TO RELATED PATENT APPLICATIONS

This application is a National Stage Entry of International Application No. PCT/JP2018/030923, filed Aug. 22, 2018, which claims priority from Japanese Patent Application No. 2017-164182, filed Aug. 29, 2017. The entire contents of the above-referenced applications are expressly incorporated herein by reference.

TECHNICAL FIELD

The present invention relates to a technique of transmitting a wavelength multiplex signal in an optical communication system, and more particularly to a technique of controlling a spectrum shape of an optical signal that is wavelength-multiplexed.

BACKGROUND ART

In an optical communication system, when a wavelength multiplex signal passes through an optical fiber, a repeater, or the like on a transmission path, a wavelength characteristic of a signal level of an optical signal is changed, which may degrade transmission quality. Thus, in order to maintain the transmission quality in the optical communication system, it is required to control a spectrum shape of a wavelength multiplex signal in such a way as to reduce a difference between signal levels of optical signals having different wavelengths. In view of this, a technique of controlling influence of the difference between the signal levels of the optical signals having wavelengths has been developed. As such a technique of suppressing the difference between the signal levels of the optical signals having wavelengths, for example, a technique as in PTL 1 is disclosed.

PTL 1 relates to an optical repeater having a function of adjusting a signal level for each wavelength. The optical repeater in PTL 1 includes a wavelength selective switch, an optical coupler, and an optical channel monitor (OCM). In the optical repeater in PTL 1, a wavelength multiplex signal is branched with the optical coupler at an output unit of the wavelength selective switch, and a signal level for each wavelength is measured with the OCM. When a wavelength having a signal level varied from a specified value is detected during measurement with the OCM, the optical repeater in PTL 1 changes an adjustment amount for the signal level at the wavelength selective switch.

PTL 2 discloses a technique relating to an optical transmission device that acquires information on a signal level of an optical transmission device being a destination of a wavelength multiplex signal and adjusts a signal level of a wavelength multiplex signal to be sent.

CITATION LIST

Patent Literature

[PTL 1] Japanese Patent No. 6067192
[PTL 2] Japanese Unexamined Patent Application Publication No. 2014-192615

SUMMARY OF INVENTION

Technical Problem

However, the technique in PTL 1 is not sufficient in view of the following point. The optical repeater in PTL 1 measures a signal level on an output side of the wavelength selective switch. However, when an element such as an optical amplifier, which has an influence depending on a wavelength of a signal level of an optical signal, is provided subsequently to the wavelength selective switch, there may be a risk in that a spectrum shape of a wavelength multiplex signal to be output to the transmission path is not formed in a shape required for maintaining the transmission quality. A spectrum shape required for a wavelength multiplex signal to be output differs in response to a characteristic of an optical fiber of the transmission path and the like, but in the technique in PTL 1, the spectrum shape of the wavelength multiplex signal to be output cannot be adjusted in response to the characteristic of the transmission path. Thus, the technique in PTL 1 is not sufficient as a technique for maintaining the transmission quality by controlling a spectrum shape of an output signal. In the technique in PTL 2, it is required to acquire information on a signal level of a side of a remote receiving device, and control for adjusting a spectrum shape of an output signal to an appropriate shape cannot be performed only with information acquired in the own device.

In order to solve the above-mentioned problems, the present invention has an object to provide an optical transmission device capable of controlling a spectrum shape of a wavelength multiplex signal and improving transmission quality.

Solution to Problem

In order to solve the above-mentioned problem, an optical transmission device according to the present invention includes a wavelength selecting means, an optical amplifying means, a measuring means, a setting means, and a control means. The wavelength selecting means includes a means for selecting, as an optical signal to be output, an optical signal having a set wavelength from a wavelength multiplex signal that is input via an optical fiber, and a means for adjusting a signal level for each optical signal having a selected wavelength, based on a setting value of an attenuation amount, and for outputting the optical signal. The optical amplifying means amplifies a wavelength multiplex signal subjected to adjustment of the signal level with the wavelength selecting means. The measuring means measures a spectrum of a wavelength multiplex signal after amplification with the optical amplifying means. The setting means sets, as output spectrum setting information, a spectrum shape being a reference of a wavelength multiplex signal to be output to a transmission path. The control means compares a spectrum measured with the measuring means and the output spectrum setting information with each other, and determines the attenuation amount when adjusting a signal level for each wavelength of a wavelength multiplex signal with the wavelength selecting means. The wavelength selecting means adjusts a signal level for each wavelength of a wavelength multiplex signal, based on the attenuation amount determined with the control means.

In a spectrum control method according to the present example embodiment, as output spectrum setting information, a spectrum shape being a reference of a wavelength multiplex signal to be output to a transmission path is set. In the spectrum control method according to the present example embodiment, as an optical signal to be output, an optical signal having a set wavelength is selected from a wavelength multiplex signal being input via an optical fiber, a signal level for each optical signal having a selected wavelength is adjusted, based on a setting value of an attenuation amount, and the optical signal is output. In the spectrum control method according to the present example embodiment, a wavelength multiplex signal that is subjected to adjustment of the signal level is amplified. In the spectrum control method according to the present example embodiment, a spectrum of a wavelength multiplex signal after amplification is measured. In the spectrum control method according to the present example embodiment, a measured spectrum and the output spectrum setting information are compared with each other, and the attenuation amount when adjusting a signal level for each wavelength of the wavelength multiplex signal is determined. In the spectrum control method according to the present example embodiment, a signal level for each wavelength of a wavelength multiplex signal is adjusted, based on the attenuation amount that is determined.

Advantageous Effects of Invention

According to the present invention, the spectrum shape of the wavelength multiplex signal can be controlled, and the transmission quality can be improved.

BRIEF DESCRIPTION OF DRAWINGS

FIG. 7 is a diagram illustrating an overview of a configuration of an optical transmission device according to a fourth example embodiment of the present invention.

EXAMPLE EMBODIMENT

First Example Embodiment

Figure 1:
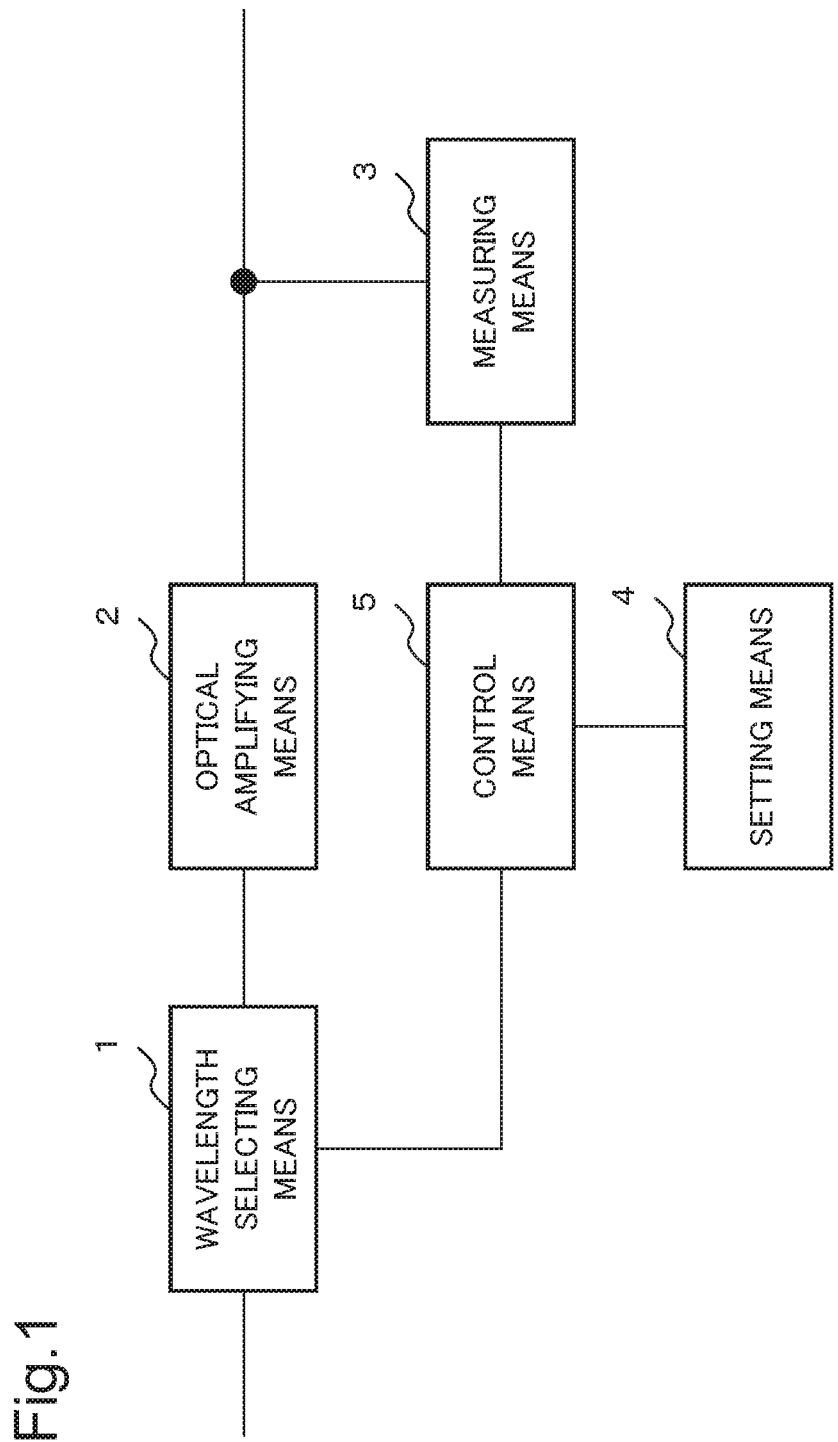
FIG. 1 is a diagram illustrating an overview of a configuration of a first example embodiment of the present invention.

With reference to the drawing, detailed description is made on a first example embodiment of the present invention. FIG. 1 illustrates an overview of a configuration of an optical transmission device according to the present example embodiment. The optical transmission device according to the present example embodiment includes a wavelength selecting means 1, an optical amplifying means 2, a measuring means 3, a setting means 4, and a control means 5. The wavelength selecting means 1 includes a means for selecting an optical signal having a set wavelength as an optical signal to be output among wavelength multiplex signals that are input via an optical fiber and a means for adjusting a signal level for each optical signal having a selected wavelength, based on a setting value of an attenuation amount, and outputting the signal. The optical amplifying means 2 amplifies the wavelength multiplex signal that is subjected to signal level adjustment with the wavelength selecting means 1. The measuring means 3 measures a spectrum of the wavelength multiplex signal after amplified with the optical amplifying means 2. The setting means 4 sets, as output spectrum setting information, a spectrum shape being a reference for a wavelength multiplex signal to be output to a transmission path. The control means 5 compares the spectrum measured with the measuring means 3 and the output spectrum setting information, and determines an attenuation amount when adjusting a signal level of the wavelength multiplex signal for each wavelength with the wavelength selecting means 1. The wavelength selecting means 1 adjusts a signal level for each wavelength of the wavelength multiplex signal, based on the attenuation amount determined with the control means 5.

In the optical transmission device according to the present example embodiment, the setting means 4 sets, as the output spectrum setting information, the spectrum shape being a reference for the wavelength multiplex signal to be output to the transmission path, and the measuring means 3 measures the spectrum of the wavelength multiplex signal after amplification. In the optical transmission device according to the present example embodiment, the control means 5 compares the spectrum measured with the measuring means 3 and the output spectrum setting information, and determines an attenuation amount for each wavelength when adjusting the signal level with the wavelength selecting means 1. In the optical transmission device according to the present example embodiment, the attenuation amount is determined by comparing the spectrum measured after being output from the optical amplifying means 2 and a desired spectrum shape, and hence the signal level can be adjusted in consideration of a characteristic change due to amplification. Thus, the optical transmission device according to the present example embodiment is capable of outputting a wavelength multiplex signal having a spectrum shape close to the most suitable shape that suppresses an influence of a characteristic of the transmission path and the like. As a result, the optical transmission device according to the present example embodiment is capable of controlling the spectrum shape of the wavelength multiplex signal to be output and improving transmission quality.

Second Example Embodiment

Figure 2:
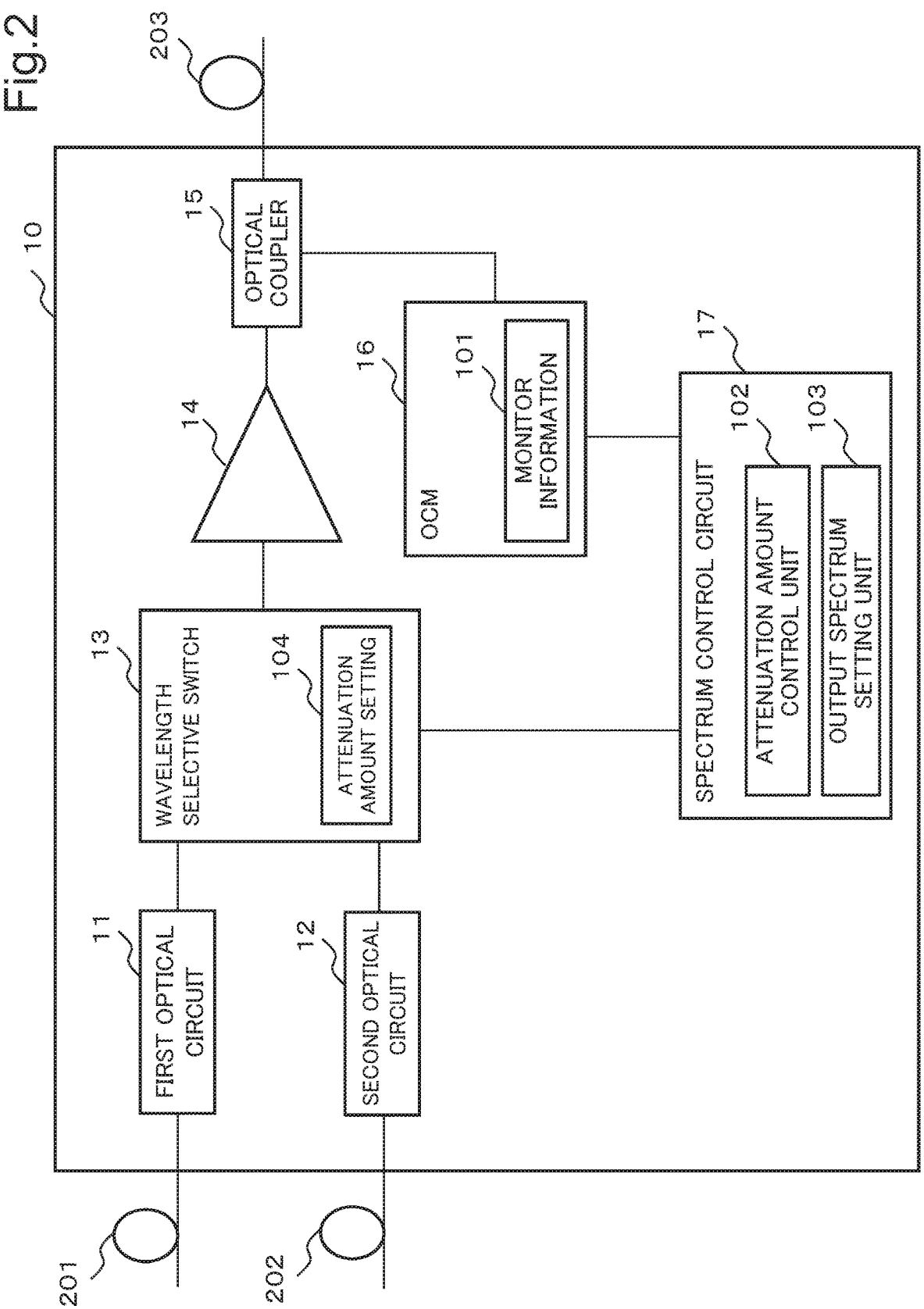
FIG. 2 is a diagram illustrating an overview of a configuration of a second example embodiment of the present invention.

With reference to the drawings, detailed description is made on a second example embodiment of the present invention. FIG. 2 illustrates an overview of a configuration of an optical transmission device according to the present example embodiment.

An optical transmission device 10 according to the present example embodiment includes a first optical circuit 11, a second optical circuit 12, a wavelength selective switch 13, an optical amplifier 14, an optical coupler 15, an optical channel monitor (OCM) 16, and a spectrum control circuit 17. The optical transmission device 10 is connected to an optical fiber 201, an optical fiber 202, and an optical fiber 203. The optical fiber 201 and the optical fiber 202 are transmission paths for transmitting optical signals to be input to the optical transmission device 10. The optical fiber 203 is a transmission path for transmitting optical signals to be output from the optical transmission device 10. The optical transmission device 10 according to the present example embodiment is configured as a reconfigurable optical add/drop multiplexer (ROADM) device. The optical transmission device 10 is used as a sending device or a repeater.

The first optical circuit 11 and the second optical circuit 12 are formed as processing circuits for the optical signals to be input to the optical transmission device 10. Each of the first optical circuit 11 and the second optical circuit 12 is formed of, for example, an optical amplifier that amplifies input wavelength multiplex signals and a splitter that separates an optical signal to be dropped with the optical transmission device 10.

The wavelength selective switch 13 selects an optical signal having a wavelength based on a setting among the wavelength multiplex signals input via the first optical circuit 11 and the second optical circuit 12. The wavelength selective switch 13 adjusts a signal level of an optical signal for each wavelength, specifically, optical power for each wavelength when selecting the optical signal.

An optical signal to be added with the optical transmission device 10 may be input to the wavelength selective switch 13.

In the wavelength selective switch 13, both adding and dropping of the optical signal may be performed.

The wavelength selective switch 13 is formed through use of, for example, micro electro mechanical systems (MEMS). The wavelength selective switch using the MEMS performs selection of a wavelength to be output and adjustment of optical power of an optical signal to be output through control of a mirror. The wavelength selective switch 13 may be other than the MEMS as long as selective output of the input optical signal and adjustment of the signal level can be performed. For example, the wavelength selective switch 13 may be formed through use of a liquid crystal on silicon (LCOS) technique. The wavelength selective switch 13 adjusts the signal level by attenuating the optical power for each wavelength, based on a setting value of an attenuation amount.

The wavelength selective switch 13 in the present example embodiment stores the setting value of the attenuation amount as an attenuation amount setting 104. The setting value of the attenuation amount is determined with the spectrum control circuit 17, and is input to the wavelength selective switch 13. The wavelength selective switch 13 adjusts the signal level of the optical signal, based on the setting value of the attenuation amount stored as the attenuation amount setting 104. The wavelength selective switch 13 in the present example embodiment is equivalent to the wavelength selecting means 1 in the first example embodiment.

The optical amplifier 14 amplifies the input wavelength multiplex signal, and outputs the signal. For example, an erbium doped optical fiber amplifier (EDFA) is used for the optical amplifier 14. The optical amplifier 14 in the present example embodiment is equivalent to the optical amplifying means 2 in the first example embodiment.

The optical coupler 15 branches wavelength multiplex signals to an output side of the optical transmission device and an input side of the OCM 16. The wavelength multiplex signal branched to the output side of the optical transmission device is output to the optical fiber 203, and is transmitted through the transmission path. An optical coupler is used for the optical coupler 15. The wavelengths included in the wavelength multiplex signals branched to two routes at the optical coupler 15 are the same as the wavelengths included in the wavelength multiplex signals that are input to the optical coupler 15.

The OCM 16 has a function of measuring the signal level by measuring the optical power of each wavelength with respect to the input wavelength multiplex signal and of acquiring a spectrum of the wavelength multiplex signal. The OCM 16 measures the optical power of each wavelength by, for example, changing a wavelength input to a photodiode by a monochromator. The OCM 16 may be configured to demultiplex the wavelength multiplex signal with an array diffraction grating or the like and measure the optical power for each of the demultiplexed optical signals with the photodiode. The OCM 16 holds, as monitor information 101, information on the spectrum of the wavelength multiplex signal based on measurement of the optical power of each wavelength, and sends the information to the spectrum control circuit 17. The function of the OCM 16 in the present example embodiment, which is for measuring the signal level, is equivalent to the measuring means 3 in the first example embodiment.

The spectrum control circuit 17 includes an attenuation amount control unit 102 and an output spectrum setting unit 103. The spectrum control circuit 17 is formed through use of a semiconductor device such as a field programmable gate array (FPGA) and an application specific integrated circuit (ASIC). Processing steps of the spectrum control circuit 17 may be performed by executing a computer program on a central processing unit (CPU).

The attenuation amount control unit 102 compares monitor information and spectrum setting information with each other, and updates the attenuation amount setting indicating the attenuation amount in the wavelength selective switch 13 when a difference is present. The attenuation amount control unit 102 determines the attenuation amount of the optical power of each wavelength in the wavelength selective switch 13 in such a way as to eliminate the difference between the monitor information and the spectrum setting information. When updating the attenuation amount setting, the attenuation amount control unit 102 sends information on the updated attenuation amount setting to the wavelength selective switch 13.

The output spectrum setting unit 103 executes an operation relating to setting of the spectrum shape being a reference for the wavelength multiplex signal to be output to the transmission path. The output spectrum setting unit 103 receives an input of the spectrum shape being a reference, and stores data on the spectrum shape being a reference as the output spectrum setting information. The spectrum shape being a reference is set as a spectrum shape desired for improving transmission quality in consideration of a characteristic of the transmission path. The spectrum shape being a reference may be input by an operator, and may be input via a communication management system or the like. The spectrum shape being a reference may be set at the time of designing or installing the optical transmission device 10. The spectrum control circuit 17 in the present example embodiment is equivalent to the setting means 4 and the control means 5 in the first example embodiment.

Description is made on an operation of the optical transmission device 10 according to the present example embodiment. First, description is made on a normal operation of the optical transmission device 10 according to the present example embodiment, specifically, an operation when processing and outputting the input wavelength multiplex signals.

The wavelength multiplex signals transmitted via the optical fiber 201 and the optical fiber 202 are input to the optical transmission device 10 via the first optical circuit 11 and the second optical circuit 12. The first optical circuit 11 and the second optical circuit 12 subject the input wavelength multiplex signals to predetermined processing, and send the signals to the wavelength selective switch 13. Examples of the predetermined processing to which input optical signals are subjected include, for example, processing of amplifying the optical signals, branching optical signals having a certain wavelength, and the like.

When the wavelength multiplex signals are input from the first optical circuit 11 and the second optical circuit 12, the wavelength selective switch 13 selects optical signals having wavelengths, based on the setting, and outputs the signals. The selected signals are set based on wavelength design of an optical communication system. When selecting the wavelengths, the wavelength selective switch 13 attenuates the optical signals for each wavelength, based on the setting value of the attenuation amount stored as the attenuation amount setting 104.

The optical signals subjected to the processing of wavelength selection and attenuation for each wavelength are sent as wavelength multiplex signals to the optical amplifier 14. When the wavelength multiplex signals are input, the optical amplifier 14 amplifies optical power, and outputs the signals. The wavelength multiplex signals output from the optical amplifier 14 are branched at the optical coupler 15, and one of the wavelength multiplex signals is output to the optical fiber 203 and is transmitted through the transmission path. Another one of the wavelength multiplex signals is sent to the OCM 16.

Figure 3:
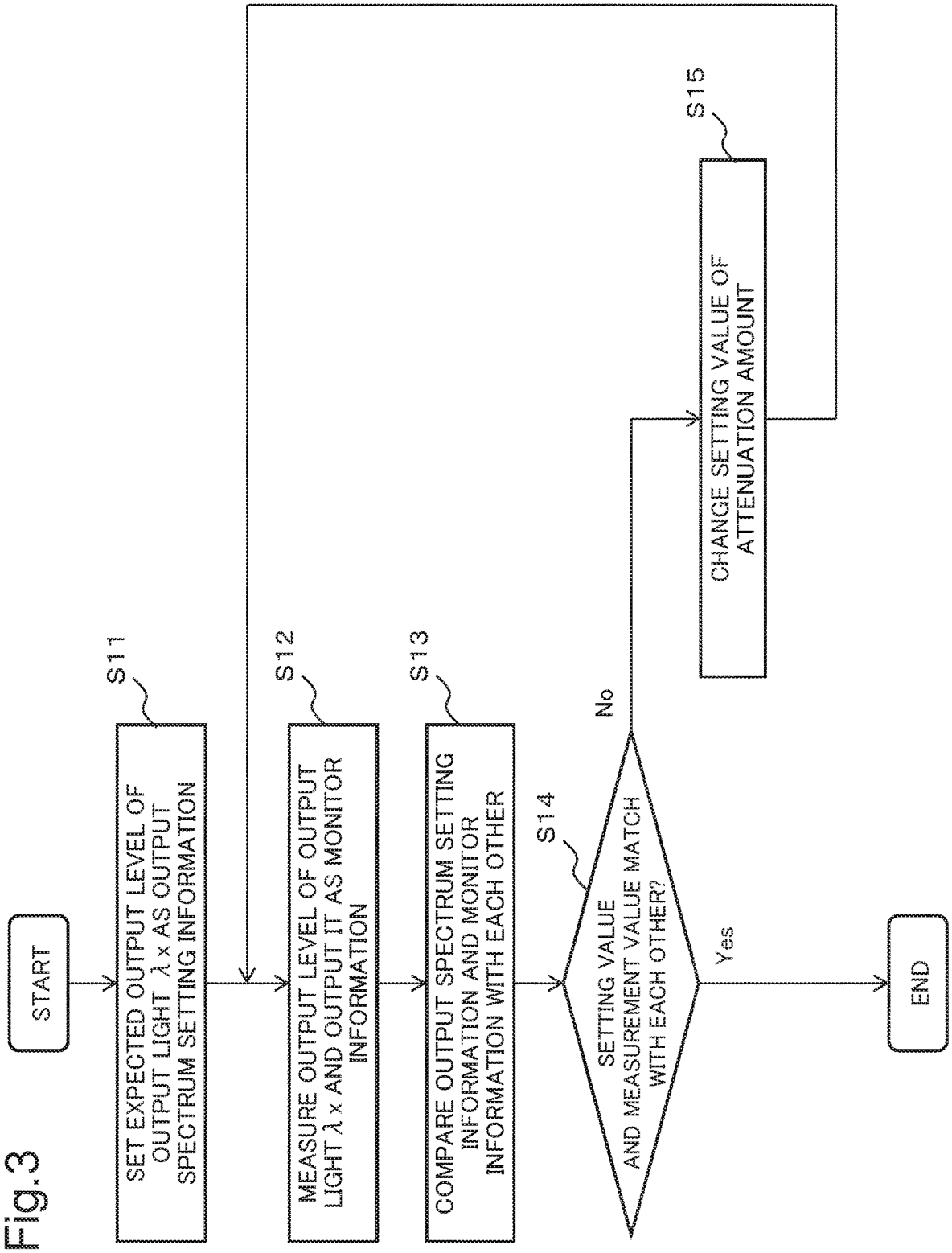
FIG. 3 is a diagram illustrating an operation flow of an optical transmission device according to the second example embodiment of the present invention.

Next, description is made on an operation when adjusting the signal level with the wavelength selective switch 13 in the optical transmission device 10 according to the present example embodiment. FIG. 3 illustrates an operation flow when adjusting the signal level in the optical transmission device 10 according to the present example embodiment.

When the optical transmission device 10 is installed, a communication setting is changed, or the like, with respect to the spectrum shape of the wavelength multiplex signal to be output to the transmission path, the spectrum shape being a reference is set as the output spectrum setting information for the output spectrum setting unit 103 of the spectrum control circuit 17. When a wavelength of output light is expressed by $\lambda x$, a setting value of a signal level for each wavelength $\lambda x$ is set as an expected output level in the output spectrum setting information (Step S11).

The spectrum shape that is set as the output spectrum setting information is set in accordance with a characteristic of the transmission path. Thus, as the spectrum shape that is set as the output spectrum setting information, a shape such as a flat shape or a tilted shape, which suppresses an influence that the optical signal receives by the transmission path depending on the wavelength, is selected. The setting of the output spectrum setting information may be performed by an operator, and may be performed via a network from a communication management system or the like.

When the setting value of the signal level of the output light is input, the spectrum control circuit 17 stores, as the output spectrum setting information, the setting value of the signal level of the output light for each wavelength.

The OCM 16 measures the optical power of each wavelength as the signal level for each of the wavelengths of the wavelength multiplex signals branched at the optical coupler 15. More specifically, the OCM 16 measures the signal level of the output light $\lambda x$ from the optical amplifier 14, which is branched at the optical coupler 15. The OCM 16 outputs, as the monitor information, a measurement result of the signal level of the output light $\lambda x$ from the optical amplifier 14 to the spectrum control circuit 17 (Step S12).

When receiving the monitor information indicating the measurement result of the signal level of the output light $\lambda x$ from the optical amplifier 14, an attenuation amount control unit 112 of the spectrum control circuit 17 compares the output spectrum setting information and the monitor information with each other (Step S13).

When the signal level in the output spectrum setting information being a setting value and the signal level in the monitor information being a measurement value are the same for all the wavelengths or have a difference falling within a predetermined reference (Yes in Step S14), the attenuation amount control unit 112 of the spectrum control circuit 17 determines that adjustment of the attenuation amount is not required. When the attenuation amount control unit 112 determines that adjustment of the attenuation amount is not required, an operation of setting the attenuation amount is completed. The operation of setting the attenuation amount is performed again at the time of changing the setting of the optical communication system or of a start instruction from an operator or a communication management system, at a predetermined time interval, or the like.

When there is a difference in signal level of the optical power between the output spectrum setting information and the monitor information (No in Step S14), the attenuation amount control unit 112 of the spectrum control circuit 17 calculates the attenuation amount for the wavelength selective switch 13, based on the difference between the setting value and the measurement value. When the attenuation amount for the wavelength selective switch 13 is calculated, the newly calculated setting value of the attenuation amount is sent to the wavelength selective switch 13 as an attenuation amount setting, and the setting of the attenuation amount is updated (Step S15).

When receiving information on the attenuation amount setting, the wavelength selective switch 13 stores, as the attenuation amount setting 104, the received setting value of the attenuation amount, and updates the attenuation amount setting. When the attenuation amount setting is updated, the wavelength selective switch 13 attenuates the optical power of the optical signal in such a way as to gain the attenuation amount indicated in the attenuation amount setting, and thus the signal level is adjusted. When the attenuation is performed by the attenuation amount indicated in the attenuation amount setting, the operations from Step S12 are repeated until the spectrum setting information and the monitor information match with each other.

Figure 4:
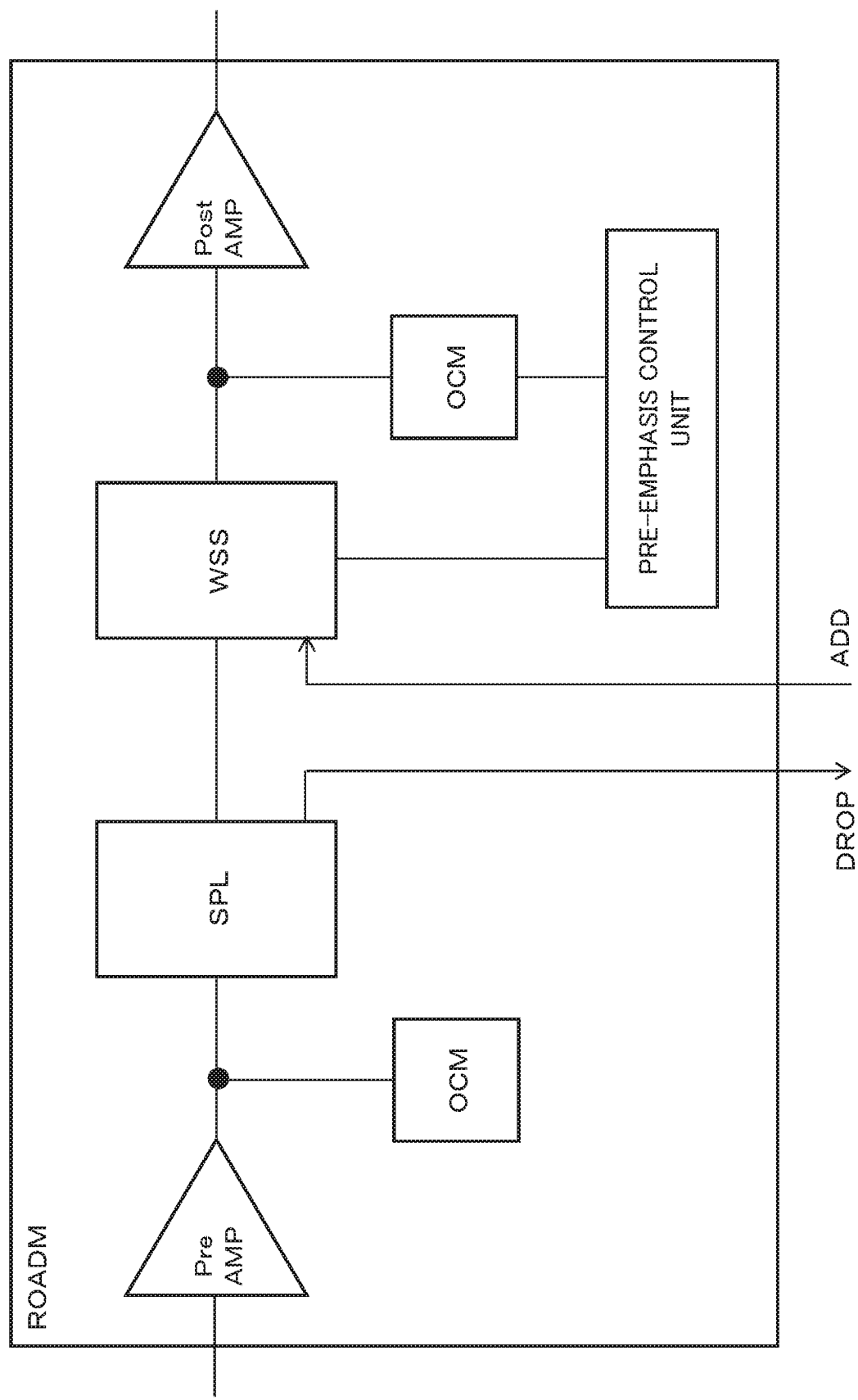
FIG. 4 is a diagram illustrating an example of a configuration of an optical transmission device in comparison with a configuration in the present invention.

FIG. 4 illustrates a configuration of an optical transmission device described in Japanese Unexamined Patent Application Publication No. 2014-192615, as an example compared with the configuration of the optical transmission device 10 according to the present example embodiment. The optical transmission device in FIG. 4 is configured as an ROADM device. In the optical transmission device in FIG. 4, input optical multiplex signals are amplified with an optical amplifier (Pre AMP), and then a part of the optical signals is dropped at a splitter (SPL). Optical signals are added at a wavelength selective switch (WSS). In FIG. 4, between the optical amplifier (Pre-AMP) on an input side of the device and the SPL and between the WSS and the optical amplifier (Post AMP) on the output side, wavelength multiplex signals are branched, and measurement of a signal level is performed with an OCM. In FIG. 4, a measurement result of the signal level between the optical amplifier (Pre-AMP) on the input side and the SPL is notified to an optical transmission device being a sender of the wavelength multiplex signals. A pre-emphasis control unit in FIG. 4 determines an attenuation amount for the WSS, based on the measurement result of the signal level, which is notified from the optical transmission device being a destination, or based on the measurement result of the signal level notified from the destination and the measurement result of the signal level at the OCM on an output side in the own device.

In the optical transmission device in FIG. 4, the measurement of the signal level is performed between the WSS and the optical amplifier. Thus, even when the WSS adjusts the spectrum shape, based on the measurement result at the OCM in the own device, an output signal having an expected spectrum shape may not be gained in some cases due to wavelength dependency of the optical amplifier at the time of amplification. In contrast, in the optical transmission device 10 according to the present example embodiment, the measurement of the signal level is performed on the output side with respect to the optical amplifier, and hence the spectrum shape can be adjusted in consideration of an influence of wavelength dependency of the optical amplifier. As a result, the optical transmission device 10 according to the present example embodiment can output a wavelength multiplex signal having a spectrum shape closer to the expected spectrum shape for improving the transmission quality.

In the optical transmission device 10 according to the present example embodiment, the attenuation amount for the wavelength selective switch 13 is set, based on the output spectrum setting information set in the spectrum control circuit 17. Thus, the optical transmission device 10 according to the present example embodiment may set the spectrum shape of the wavelength multiplex signal to be output to have an optional shape including a flat shape, a tilted shape, and the like. In the optical transmission device 10 according to the present example embodiment, storage of the spectrum setting information and measurement of the optical signal are performed in the own device, and hence the spectrum shape of the output light can be adjusted without requiring information from a receiving side. Thus, the configuration of the optical transmission device and the optical communication system can be simplified.

In the optical transmission device 10 according to the present example embodiment, the output signal from the optical amplifier 14 is measured, and hence adjustment can be performed in consideration of an influence of a change of a wavelength distribution at the optical amplifier 14 or the like. Thus, in the optical transmission device 10 according to the present example embodiment, accuracy in controlling the spectrum shape of the output light is improved.

As described above, the optical transmission device 10 according to the present example embodiment is capable of controlling the spectrum shape of the wavelength multiplex signal and improving the transmission quality.

Third Example Embodiment

Figure 5:
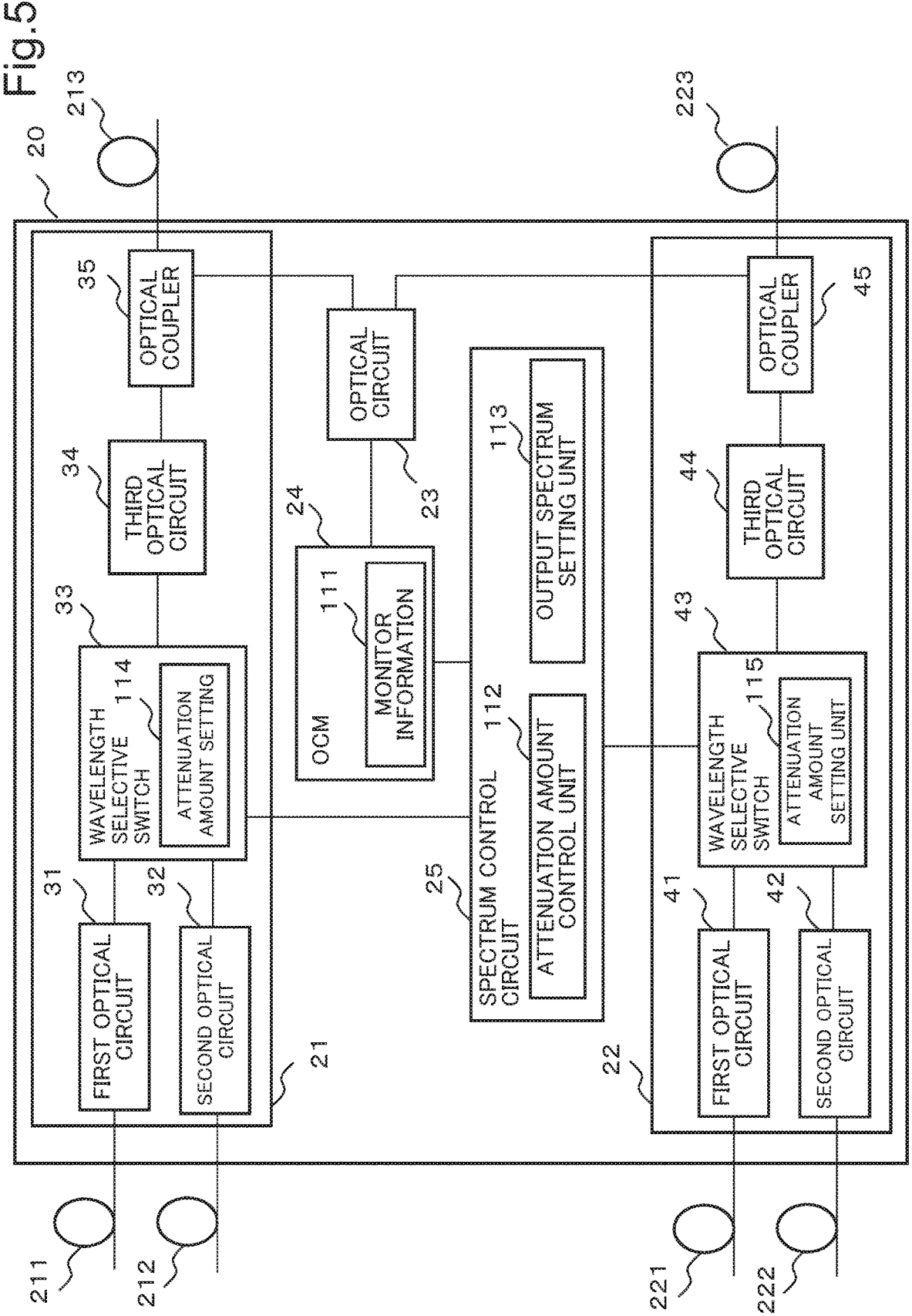
FIG. 5 is a diagram illustrating an overview of a configuration of a third example embodiment of the present invention.

With reference to the drawings, detailed description is made on a third example embodiment of the present invention. FIG. 5 illustrates an overview of a configuration of an optical transmission device 20 according to the present example embodiment. The optical transmission device 10 according to the second example embodiment includes one wavelength selective switch 13, and outputs the wavelength multiplex signal subjected to the processing to one transmission path, and in contrast, the optical transmission device 20 according to the present example embodiment includes a plurality of wavelength selecting switches, and performs processing of an output to a plurality of transmission paths.

The optical transmission device 20 according to the present example embodiment includes a first optical system 21, a second optical system 22, an optical circuit 23, an OCM 24, and a spectrum control circuit 25.

The first optical system 21 includes a first optical circuit 31, a second optical circuit 32, a wavelength selective switch 33, a third optical circuit 34, and an optical coupler 35.

The first optical circuit 31 is connected to an optical fiber 211. The second optical circuit 32 is connected to an optical fiber 212. The optical coupler 35 is connected to an optical fiber 213. The optical transmission device 20 according to the present example embodiment is configured as an ROADM device. The optical transmission device 20 is used as a sending device or a repeater.

Configurations and functions of the first optical circuit 31, the second optical circuit 32, the wavelength selective switch 33, the third optical circuit 34, and the optical coupler 35 are the same as those of the parts denoted with the identical names in the second example embodiment. The third optical circuit 34 is an optical amplifier or an optical circuit having wavelength dependency for change in the signal level at the time of passing.

The second optical system 22 includes a first optical circuit 41, a second optical circuit 42, a wavelength selective switch 43, a third optical circuit 44, and an optical coupler 45.

The first optical circuit 41 is connected to an optical fiber 221. The second optical circuit 42 is connected to an optical fiber 222. The optical coupler 45 is connected to an optical fiber 223. The optical fiber 211, the optical fiber 212, the optical fiber 221, and the optical fiber 222 are transmission path for transmitting optical signals to be input to the optical transmission device 20. The optical fiber 213 and the optical fiber 223 are transmission path for transmitting optical signals output from the optical transmission device 20.

The configurations and functions of the first optical circuit 41, the second optical circuit 42, the wavelength selective switch 43, the third optical circuit 44, and the optical coupler 45 are the same as those of the parts denoted with the identical names in the second example embodiment. The third optical circuit 44 is an optical amplifier or an optical circuit having wavelength dependency for change in the signal level at the time of passing.

The optical circuit 23 is an input circuit for inputting, to the OCM 24, the wavelength multiplex signals branched at the optical coupler 35 of the first optical system 21 and the optical coupler 45 of the second optical system 22. The optical circuit 23 is formed as a switch circuit that selects a wavelength multiplex signal to be input from any one of the optical couplers and inputs the selected signal to the OCM 24.

The OCM 24 measures signal levels of the wavelength multiplex signals branched at the optical coupler 35 and the optical coupler 45. With respect to the wavelength multiplex signal input from each of the optical coupler 35 and the optical coupler 45, the OCM 24 measures the optical power of each wavelength by, for example, changing a wavelength input to a photodiode by a monochromator. With respect to each of the first optical system 21 and the second optical system 22, the OCM 24 sends information on the signal level for each wavelength as the monitor information to the spectrum control circuit 25.

The spectrum control circuit 25 includes an attenuation amount control unit 112 and an output spectrum setting unit 113. With respect to the first optical system 21 and the second optical system 22, the attenuation amount control unit 112 compares the monitor information and the output spectrum setting information with each other, and when there is a difference, the attenuation amount setting indicating the attenuation amount for the wavelength selective switch 33 is updated. The attenuation amount control unit 112 determines the setting value of the attenuation amount, similarly to the attenuation amount control unit 102 in the second example embodiment.

The attenuation amount control unit 112 performs processing relating to the setting of the output spectrum setting information for each of the first optical system 21 and the second optical system 22. With respect to the first optical system 21 and the second optical system 22, the attenuation amount control unit 112 stores a spectrum shape of the output signal, which is a reference, as the output spectrum setting information.

Description is made on an operation of the optical transmission device 20 according to the present example embodiment. A normal operation of the optical transmission device 20 according to the present example embodiment, specifically, an operation when processing the input wavelength multiplex signals and outputting the signals is the same as the operation of the optical transmission device 10 according to the second example embodiment.

Figure 6:
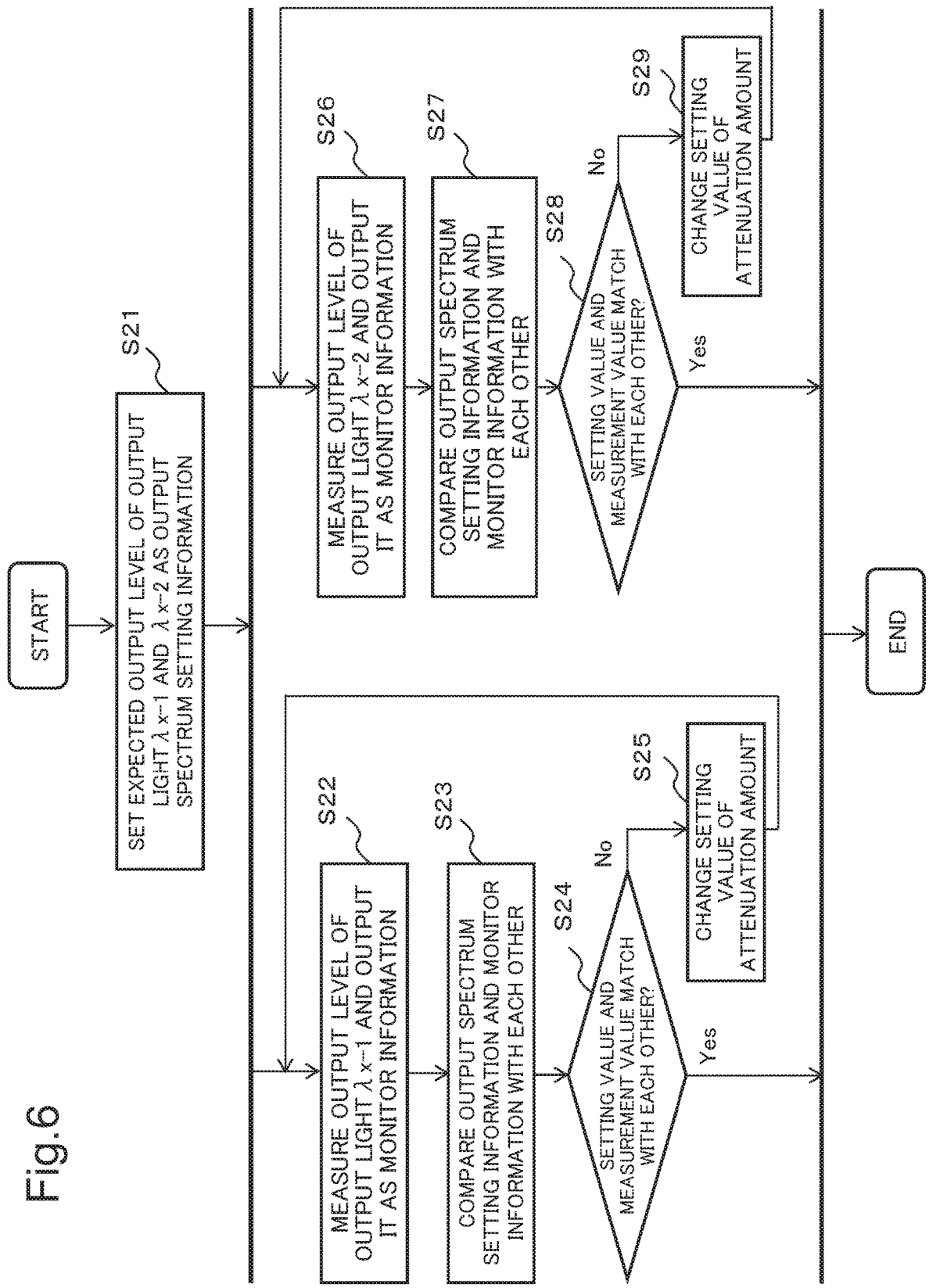
FIG. 6 is a diagram illustrating an operation flow of an optical transmission device according to the third example embodiment of the present invention.

Next, description is made on an operation when adjusting the signal level with the wavelength selective switch 33 and the wavelength selective switch 43 in the optical transmission device 20 according to the present example embodiment. FIG. 6 illustrates an operation flow when setting the attenuation amount with the wavelength selective switches in the optical transmission device 20 according to the present example embodiment.

The output spectrum setting unit 113 of the spectrum control circuit 25 sets the setting value of the signal level of output light. In the optical transmission device 20 according to the present example embodiment, the spectrum shape of the optical signal for each of a wavelength $\lambda x$-1 to be output to the optical fiber 213 and a wavelength $\lambda x$-2 to be output to the optical fiber 213 is set as the output spectrum setting information (Step S21). The setting of the output spectrum setting information may be performed by an operator, or may be performed via a network from a communication management system or the like.

When the setting value of the signal level of the output light is input, the output spectrum setting unit 113 of the spectrum control circuit 25 stores, as the output spectrum setting information, the setting value of the signal level of the output light for each wavelength in the first optical system 21 and the second optical system 22.

The OCM 24 measures a signal level for each wavelength as the signal level for each of the wavelengths of the wavelength multiplex signals branched at the optical coupler 35. The OCM 24 measures the optical power of each wavelength of output light $\lambda x$-1 from the third optical circuit 34, which is branched at the optical coupler 35, and stores a measurement result of a spectrum of an output signal of the first optical system 21 as monitor information 111. When the spectrum of the output signal of the first optical system 21 is stored as the monitor information, the OCM 24 outputs the monitor information indicating the measurement result of the signal level of the output light $\lambda x$-1 to the spectrum control circuit 25 (Step S22).

When receiving the monitor information indicating the spectrum of the output light $\lambda x$-1 from the third optical circuit 34, the attenuation amount control unit 112 of the spectrum control circuit 25 compares the output spectrum setting information and the monitor information with each other (Step S23).

When the signal level in the output spectrum setting information being the setting value and the signal level in the monitor information being the measurement value are the same for all the wavelengths or have a difference falling within a predetermined reference (Yes in Step S24), the attenuation amount control unit 112 of the spectrum control circuit 25 determines that adjustment of the attenuation amount is not required. When the attenuation amount control unit 112 determines that adjustment of the attenuation amount is not required, the operation of setting the attenuation amount is completed.

When there is a difference in signal level between the output spectrum setting information and the monitor information (No in Step S24), the attenuation amount control unit 112 of the spectrum control circuit 25 calculates the attenuation amount for the wavelength selective switch 33, based on the difference between the setting value and the measurement value. When the attenuation amount for the wavelength selective switch 33 is calculated, the newly calculated setting value of the attenuation amount is sent to the wavelength selective switch 33 as the attenuation amount setting, and the setting of the attenuation amount is updated (Step S25).

When receiving the information on the attenuation amount setting, the wavelength selective switch 33 stores the received attenuation amount setting as an attenuation amount setting 114, and updates the attenuation amount setting. When the attenuation amount setting is updated, the wavelength selective switch 33 attenuates and outputs the optical signal in such a way as to gain the attenuation amount indicated in the attenuation amount setting. When the attenuation is performed by the attenuation amount indicated in the attenuation amount setting, the operations from Step S22 are repeated until the spectrum setting information and the monitor information match with each other.

The OCM 24 measures a signal level for each wavelength as the signal level for each of the wavelengths of the wavelength multiplex signals branched at the optical coupler 45. The OCM 24 measures the optical power of each wavelength of output light $\lambda x$-2 from the third optical circuit 44, which is branched at the optical coupler 35. The OCM 24 stores a measurement result of a spectrum of the output light $\lambda x$-2 from the third optical circuit 44 as the monitor information 111 in the second optical system 22, and outputs the measurement result to the spectrum control circuit 25 (Step S26).

When receiving the monitor information indicating the spectrum of the output light $\lambda x$-2 from the third optical circuit 34, the attenuation amount control unit 112 of the spectrum control circuit 25 compares the output spectrum setting information and the monitor information with each other (Step S27).

When the signal level in the output spectrum setting information being the setting value and the signal level in the monitor information being the measurement value are the same for all the wavelengths or have a difference falling within a predetermined reference (Yes in Step S28), the attenuation amount control unit 112 of the spectrum control circuit 25 determines that adjustment of the attenuation amount is not required. The attenuation amount control unit 112 determines that adjustment of the attenuation amount is not required, the operation of setting the attenuation amount is completed.

When there is a difference in signal level of the optical power between the output spectrum setting information and the monitor information (No in Step S28), the attenuation amount control unit 112 of the spectrum control circuit 25 calculates the attenuation amount for the wavelength selective switch 43, based on the difference between the setting value and the measurement value. When the attenuation amount for the wavelength selective switch 43 is calculated, the newly calculated setting value of the attenuation amount is sent as the attenuation amount setting to the wavelength selective switch 43, and the setting of the attenuation amount is updated (Step S29).

When receiving the information on the attenuation amount setting, the wavelength selective switch 43 stores the received attenuation amount setting as an attenuation amount setting 115, and updates the attenuation amount setting. When the attenuation amount setting is updated, the wavelength selective switch 43 attenuates and outputs the optical signal in such a way as to gain the attenuation amount indicated in the attenuation amount setting. When the attenuation is performed by the attenuation amount indicated in the attenuation amount setting, the operations from Step S26 are repeated until the spectrum setting information and the monitor information match with each other.

The optical transmission device 20 according to the present example embodiment exerts effects similar to the second example embodiment. Even when an input and an output are performed via the plurality of optical fibers, the optical transmission device 20 according to the present example embodiment is capable of accurately controlling the spectrum shape of the output signal in accordance to the characteristic of the transmission path.

Fourth Example Embodiment

With reference to the drawing, detailed description is made on a fourth example embodiment of the present invention. FIG. 7 illustrates an overview of a configuration of an optical transmission device 50 according to the present example embodiment. The optical transmission device 50 according to the present example embodiment is characterized in that processing for wavelength multiplex signals in different wavelength bands is performed with wavelength selective switches that are respectively associated with the wavelength bands and that an output is performed via one transmission path.

The optical transmission device 50 according to the present example embodiment includes a first optical system 51, a second optical system 52, an optical circuit 53, an OCM 54, a spectrum control circuit 55, a first BAND filter 56, a second BAND filter 57, and a third BAND filter 58. The OCM 54 stores monitor information 121. The spectrum control circuit 55 further includes an attenuation amount control unit 122 and an output spectrum setting unit 123.

The first BAND filter 56 is connected to an optical fiber 231 for transmitting an input signal to the optical transmission device 50. The second BAND filter 57 is connected to an optical fiber 232 for transmitting an input signal to the optical transmission device 50. The third BAND filter 58 is connected to an optical fiber 233 for transmitting an output signal from the optical transmission device 50. The optical transmission device 50 according to the present example embodiment is configured as an ROADM device. The optical transmission device 50 is used as a sending device or a repeater.

The first optical system 51 includes a first optical circuit 61, a second optical circuit 62, a wavelength selective switch 63, a third optical circuit 64, and an optical coupler 65. The wavelength selective switch 63 stores data on an attenuation amount setting 124. The configurations and functions of the first optical circuit 61, the second optical circuit 62, the wavelength selective switch 63, and the optical coupler 65 are the same as the parts denoted with the identical names in the second example embodiment. The configuration and function of the third optical circuit 64 is the same as those of the third optical circuit 34 of the first optical system 21 in the third example embodiment.

The second optical system 52 includes a first optical circuit 71, a second optical circuit 72, a wavelength selective switch 73, a third optical circuit 74, and an optical coupler 75. The wavelength selective switch 73 stores data on an attenuation amount setting 125. The configurations and functions of the first optical circuit 71, the second optical circuit 72, the wavelength selective switch 73, and the optical coupler 75 are the same as the parts denoted with the identical names in the second example embodiment. The configuration and function of the third optical circuit 74 is the same as those of the third optical circuit 44 of the second optical system 22 in the third example embodiment.

The configurations and functions of the optical circuit 53, the OCM 54, and the spectrum control circuit 55 are the same as the parts denoted with the identical names in the third example embodiment.

The first BAND filter 56 branches the wavelength multiplex signals input from the optical fiber 221 to a wavelength multiplex signal in a C-band and a wavelength multiplex signal in an L-band. The first BAND filter 56 sends the wavelength multiplex signal in the C-band to the first optical circuit 61 of the first optical system 51. The first BAND filter 56 sends the wavelength multiplex signal in the L-band to the first optical circuit 71 of the second optical system 52.

The second BAND filter 57 branches wavelength multiplex signals input from the optical fiber 222 to a wavelength multiplex signal in a C-band and a wavelength multiplex signal in an L-band. The second BAND filter 57 sends the wavelength multiplex signal in the C-band to the second optical circuit 62 of the first optical system 51. The second BAND filter 57 sends the wavelength multiplex signal in the L-band to the second optical circuit 72 of the second optical system 52.

The first BAND filter 56 and the second BAND filter 57 perform branching by, for example, using an optical multi-layered film filter to cause a signal in one wavelength band to pass and a signal in another wavelength band to be reflected, and to thereby output the signals from different ports. The first BAND filter 56 and the second BAND filter 57 may be formed through use of spectral elements such as a diffraction grating.

The third BAND filter 58 multiplexes the wavelength multiplex signal in the C-band, which is output from the optical coupler 65 of the first optical system 51, and the wavelength multiplex signal in the L-band, which is output from the optical coupler 75 of the second optical system 52, and outputs the signals to the optical fiber 223. As the third BAND filter 58, for example, an optical multi-layered film filter can be used. The third BAND filter 58 may be formed through use of a multiplex element such as an optical coupler.

The optical transmission device 50 according to the present example embodiment controls the spectrum shape of the output signal, similarly to the optical transmission device 20 according to the third example embodiment. Specifically, with respect to each of the output signals in the C-band and the L-band, the output spectrum setting information is set and the setting is performed in such a way that a difference between the measurement value and the setting value of the signal level is reduced, and the wavelength selective switch performs attenuation of the optical signal for each wavelength, based on the attenuation amount.

In the present example embodiment, the examples with the optical signals in the C-band and the L-band have been given, but the wavelength band of the optical signals may be other than the C-band and the L-band. A configuration in which three or more optical systems are included for processing three or more wavelength bands may be appropriate as well.

The optical transmission device 50 according to the present example embodiment adjusts the signal level, based on the output spectrum setting information set for each of the C-band and the L-band. Thus, with respect to the optical signal for each wavelength band, the optical transmission device 50 according to the present example embodiment is capable of outputting the wavelength multiplex signal having the spectrum shape in consideration of the characteristic of the transmission path.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-164182, filed on Aug. 29, 2017, the disclosure of which is incorporated herein in its entirety by reference.

REFERENCE SIGNS LIST

1 Wavelength selecting means
2 Optical amplifying means
3 Measuring means
4 Setting means
5 Control means
10 Optical transmission device
11 First optical circuit
12 Second optical circuit
13 Wavelength selective switch
14 Optical amplifier
15 Optical coupler
16 OCM
17 Spectrum control circuit
20 Optical transmission device
21 First optical system
22 Second optical system
23 Optical circuit
24 OCM
25 Spectrum control circuit
31 First optical circuit
32 Second optical circuit
33 Wavelength selective switch
34 Third optical circuit
35 Optical coupler
41 First optical circuit
42 Second optical circuit
43 Wavelength selective switch
44 Third optical circuit
45 Optical coupler
50 Optical transmission device
51 First optical system
52 Second optical system
53 Optical circuit
54 OCM
55 Spectrum control circuit
56 First BAND filter
57 Second BAND filter
58 Third BAND filter
61 First optical circuit
62 Second optical circuit
63 Wavelength selective switch
64 Third optical circuit
65 Optical coupler
71 First optical circuit
72 Second optical circuit
73 Wavelength selective switch
74 Third optical circuit
75 Optical coupler
101 Monitor information
102 Attenuation amount control unit
103 Output spectrum setting unit
104 Attenuation amount setting
111 Monitor information
112 Attenuation amount control unit
113 Output spectrum setting unit
114 Attenuation amount setting
115 Attenuation amount setting
121 Monitor information
122 Attenuation amount control unit
123 Output spectrum setting unit
124 Attenuation amount setting
125 Attenuation amount setting
201 Optical fiber
202 Optical fiber
203 Optical fiber
211 Optical fiber
212 Optical fiber
213 Optical fiber
221 Optical fiber
222 Optical fiber
223 Optical fiber
231 Optical fiber
232 Optical fiber
233 Optical fiber

The invention claimed is:

1. An optical transmission device, comprising:
a wavelength selecting unit including:
a unit selecting, as an optical signal to be output, an optical signal having a set wavelength from a wavelength multiplex signal that is input via an optical fiber; and
a unit adjusting a signal level of the optical signal having a selected wavelength, based on a setting value of an attenuation amount, and outputting the optical signal;
an optical amplifying unit amplifying a wavelength multiplex signal subjected to adjustment of a signal level with the wavelength selecting unit;
a measuring unit measuring a spectrum of a wavelength multiplex signal after amplification with the optical amplifying unit;

a setting unit setting, as output spectrum setting information, a spectrum shape being a reference of a wavelength multiplex signal to be output to a transmission path;

a control unit comparing a spectrum measured with the measuring unit and the output spectrum setting information with each other and determining the attenuation amount when adjusting a signal level for each wavelength of a wavelength multiplex signal with the wavelength selecting unit;

a plurality of pairs of the wavelength selecting unit and the optical amplifying unit;

a demultiplexing unit demultiplexing an input wavelength multiplex signal to wavelength multiplex signals for each wavelength band; and a multiplexing unit multiplexing wavelength multiplex signals for each wavelength band, wherein the wavelength selecting unit adjusts a signal level for each wavelength of a wavelength multiplex signal, based on the attenuation amount determined with the control unit, the measuring unit measures a spectrum of a wavelength multiplex signal after amplification for each of pairs of the wavelength selecting unit and the optical amplifying unit, the control unit compares a spectrum measured with the measuring unit and the output spectrum setting information with each other, and determines the attenuation amount for each of the wavelength selecting unit, the demultiplexing unit outputs a demultiplexed wavelength multiplex signal to the wavelength selecting unit allocated for each wavelength band, and the multiplexing unit multiplexes wavelength multiplex signals that are each amplified with the optical amplifying unit associated with the wavelength selecting unit allocated to each wavelength band.

2. The optical transmission device according to claim 1, wherein the output spectrum setting information is set for each of pairs of the wavelength selecting unit and the optical amplifying unit.

3. The optical transmission device according to claim 1, further comprising at least two demultiplexing units that are associated to a plurality of optical fibers for transmitting wavelength multiplex signals, wherein the demultiplexing unit demultiplexes a wavelength multiplex signal that is input via the optical fiber to wavelength multiplex signals for each wavelength band and outputs the demultiplexed wavelength multiplex signal to the wavelength selecting unit allocated to each wavelength band.

4. The optical transmission device according to claim 1, wherein the demultiplexing unit demultiplexes an input wavelength multiplex signal to a wavelength multiplex signal in a C-band and a wavelength multiplex signal in an L-band, and outputs a wavelength multiplex signal to the wavelength selecting unit associated to each of a C-band and an L-band, and the multiplexing unit multiplexes a wavelength multiplex signal in a C-band and a wavelength multiplex signal in a L-band that are each amplified with the associated optical amplifying unit.

5. The optical transmission device according to claim 1, wherein the output spectrum setting information is set, based on a transmission characteristic of the transmission path.

6. The optical transmission device according to claim 1, further comprising at least two demultiplexing units that are associated to a plurality of optical fibers for transmitting wavelength multiplex signals, wherein the output spectrum setting information is set for each of pairs of the wavelength selecting unit and the optical amplifying unit, and the demultiplexing unit demultiplexes a wavelength multiplex signal that is input via the optical fiber to wavelength multiplex signals for each wavelength band and outputs the demultiplexed wavelength multiplex signal to the wavelength selecting unit allocated to each wavelength band.

7. The optical transmission device according to claim 1, wherein the output spectrum setting information is set for each of pairs of the wavelength selecting unit and the optical amplifying unit, the demultiplexing unit demultiplexes an input wavelength multiplex signal to a wavelength multiplex signal in a C-band and a wavelength multiplex signal in an L-band, and outputs a wavelength multiplex signal to the wavelength selecting unit associated to each of a C-band and an L-band, and the multiplexing unit multiplexes a wavelength multiplex signal in a C-band and a wavelength multiplex signal in a L-band that are each amplified with the associated optical amplifying unit.

8. A spectrum control method, comprising:

setting, as output spectrum setting information, a spectrum shape being a reference of a wavelength multiplex signal to be output to a transmission path;

selecting, as an optical signal to be output, an optical signal having a set wavelength from a wavelength multiplex signal being input via an optical fiber;

demultiplexing a wavelength multiplex signal that is input via an optical fiber to wavelength multiple signals for each wavelength band;

inputting each of demultiplexed wavelength multiplex signals to a wavelength selective switch allocated to each wavelength band;

at each of the wavelength selective switches, selecting an optical signal having a set wavelength from input wavelength multiplex signals, and adjusting a signal level for the optical signal having a selected wavelength, based on a setting value of an attenuation amount;

amplifying the wavelength multiplex signal for each wavelength band that is subjected to adjustment of a signal level;

measuring a spectrum of a wavelength multiplex signal after amplification for each wavelength band;

comparing a measured spectrum and the output spectrum setting information with each other, and determining the attenuation amount for each wavelength band when adjusting a signal level for each wavelength of the wavelength multiplex signal;

adjusting a signal level for each wavelength of a wavelength multiplex signal, based on the attenuation amount that is determined; and multiplexing wavelength multiplex signals after amplification for each wavelength band and outputting a multiplexed signal to an optical fiber.

* * * * *